Aug. 3, 1937.  C. C. ENGLISH  2,088,779
ROTARY ENGINE
Filed March 30, 1935  5 Sheets-Sheet 1
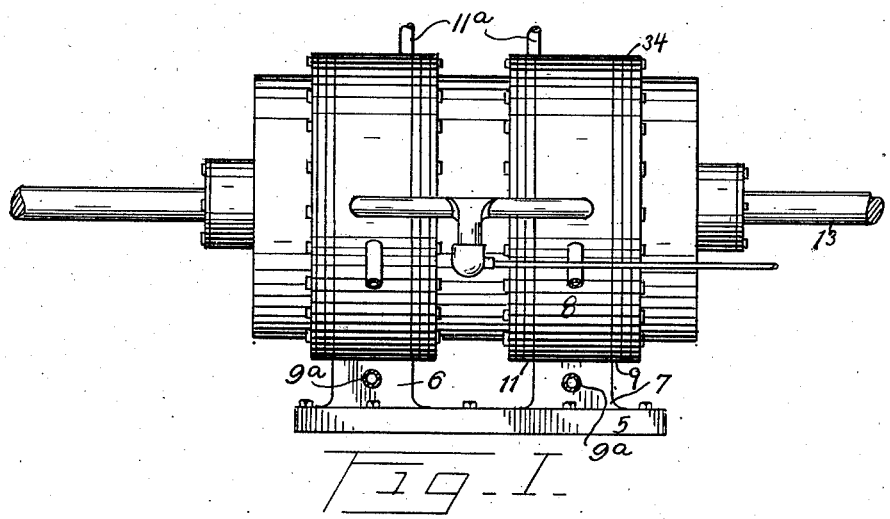
Fig. I.
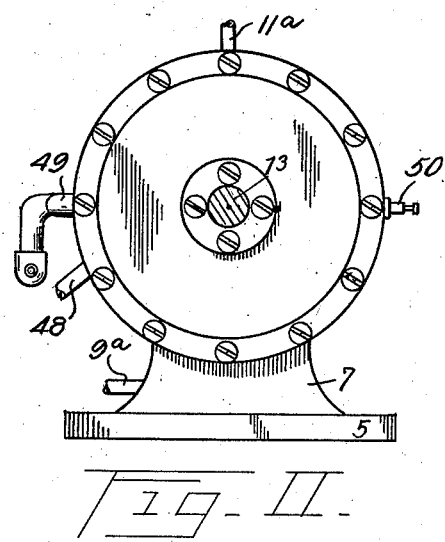
Fig. II.
INVENTOR.
C. C. ENGLISH
BY
ATTORNEY

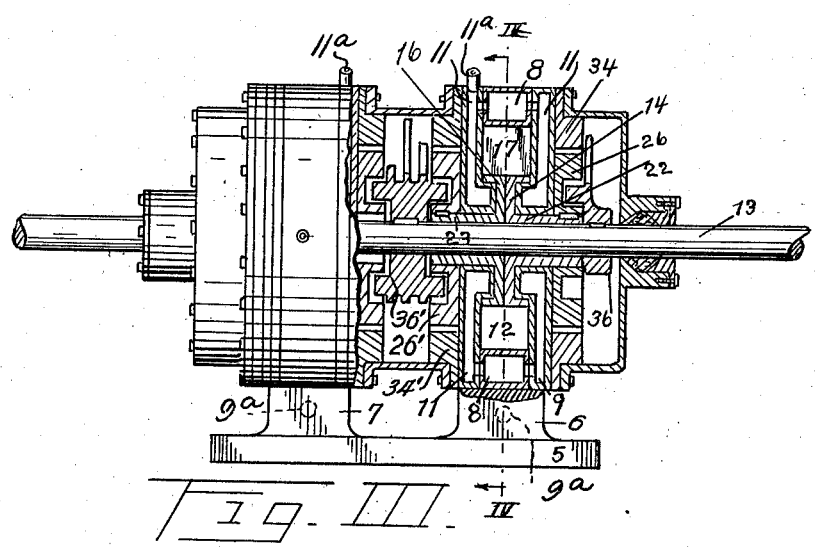
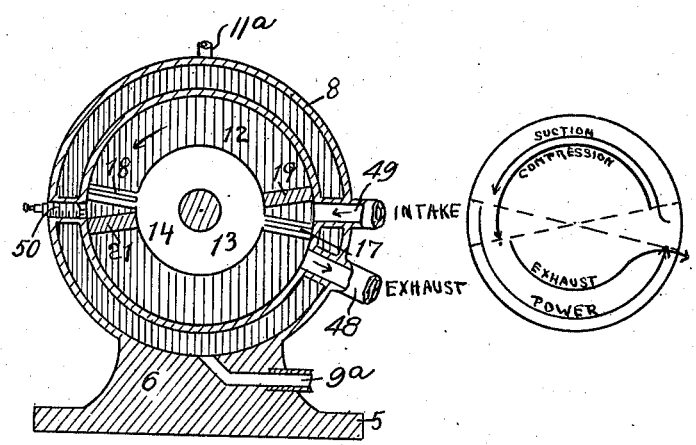

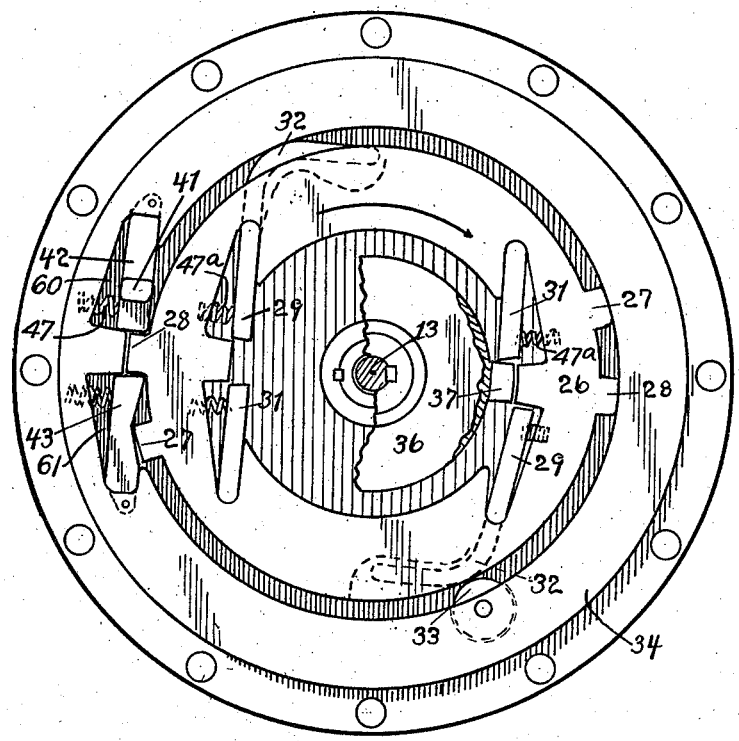
Fig. VI.
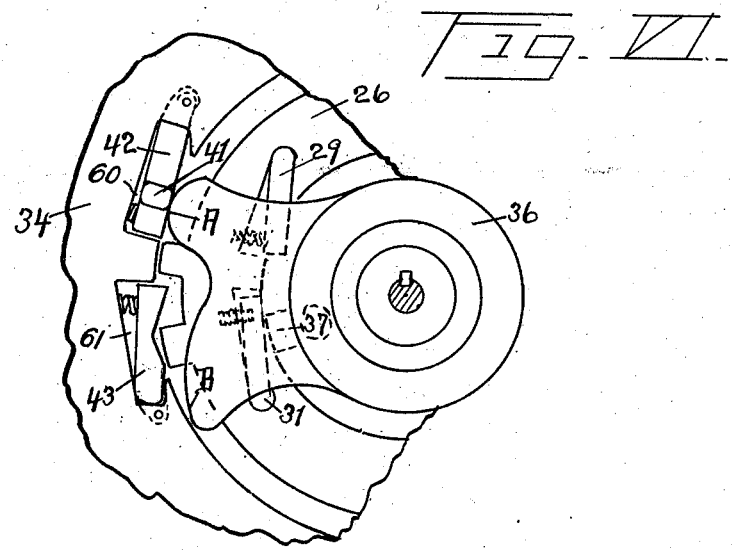
Fig. VII.
INVENTOR.
C. C. ENGLISH

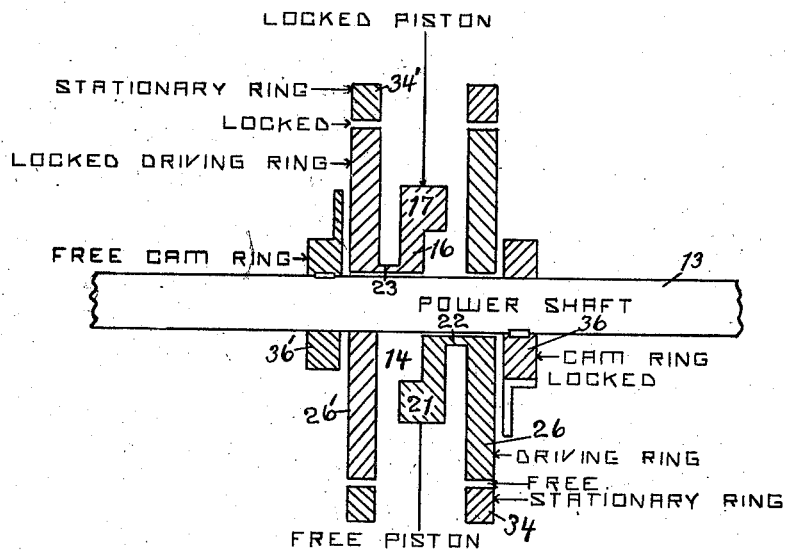
Fig. VIII.
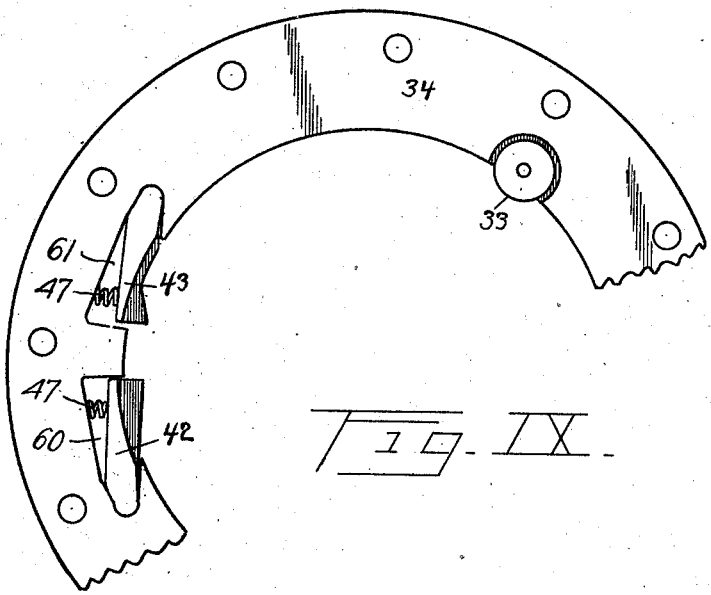
Fig. IX.

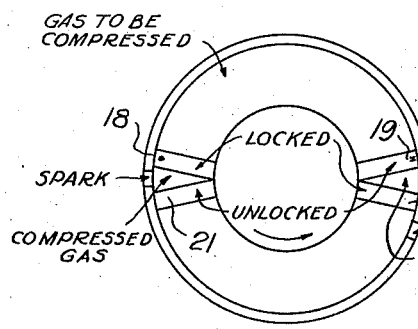
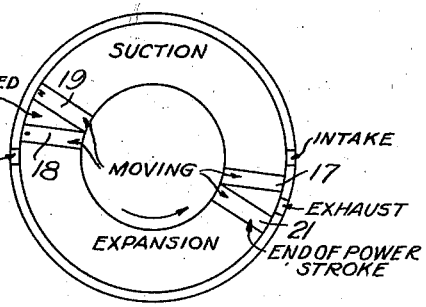
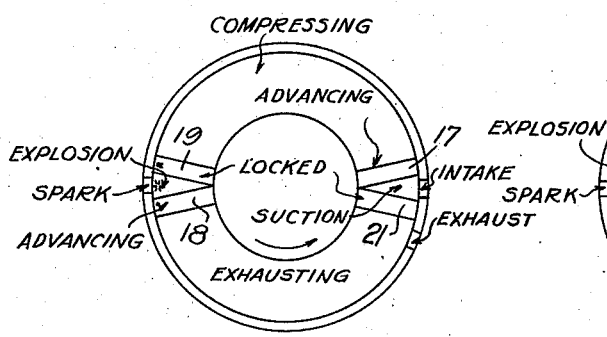
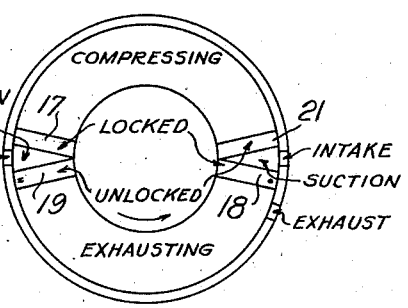
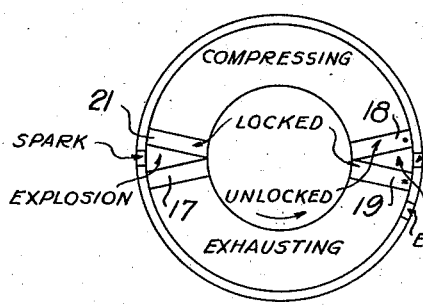
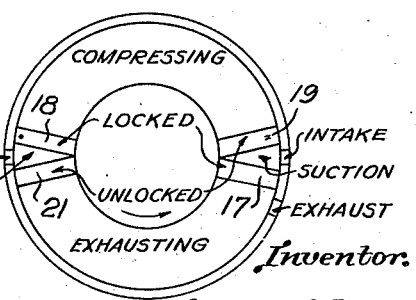
Inventor:
CLARENCE C. ENGLISH.

Patented Aug. 3, 1937

2,088,779

UNITED STATES PATENT OFFICE 2,088,779

ROTARY ENGINE

Clarence C. English, San Francisco, Calif.

Application March 30, 1935, Serial No. 13,921

5 Claims. (Cl. 123—11)

This invention relates to improvements in engines and has particular reference to a rotary engine of the type wherein the piston moves in a circular direction, in counter-distinction to the ordinary reciprocating type of piston.

The principal object of the invention is to produce an engine wherein any expansive force, such as an explosive force, may be converted into rotary movement of a driving shaft.

A further object is to produce a device which is extremely simple in its construction, one having a minimum amount of parts, which parts are duplicated in building up a unit, and a device in which several units may be joined in end to end relation.

Another object is to produce a device wherein all of the parts are so balanced that vibration is eliminated.

A still further object is to provide means for positively controlling the locking and unlocking action between a free turning shaft and the driving pistons.

Other objects and advantages will be apparent during the course of the following description.

In the accompanying drawings forming a part of this specification and in which like numerals are employed to designate like parts throughout the same, Fig. I is a side elevation of my engine as the same would appear as an internal combustion engine, Fig. II is an end elevation of Fig. I, Fig. III is a view similar to Fig. I, showing a portion thereof cut away, Fig. IV is a cross sectional view on the line 4—4 of Fig. III, Fig. V is a diagrammatic illustration showing the intake, compression, power and exhaust cycles of a unit of the present invention when used to perform the service of an internal combustion engine, Fig. VI is an end view with the housings removed, showing the lock actuating mechanism, the view presenting the right end of the sectioned structure of Fig. III with the casing omitted, and with parts broken away, Fig. VII is a fragmentary detail view on an enlarged scale, showing the lock actuating mechanism cam, Fig. VIII is a diagrammatic view illustrating both halves of a unit and the manner in which each half functions, and Fig. IX is a fragmentary rear elevation of the stationary ring showing the back of the holding dogs.

Figs. X to XV, inclusive, are diagrammatic views indicating the positions of the pistons during various activities of the cycle or operation.

Applicant has created a rotary engine consisting of a comparatively small number of parts through which a driving shaft passes and by an ingenious system of latching mechanism, he is enabled to alternately deliver to the shaft impulses whereby power may be developed in a most efficient manner.

In the accompanying drawings wherein, for the purpose of illustration, is shown a preferred embodiment of the invention, the numeral 5 designates a base upon which the pedestals 6 and 7 are mounted. Each of these pedestals carries a complete unit, as indicated in Fig. III, the units being operative as individuals so far as the cyclar operation is concerned, but being co-operative in the driving of the drive shaft, indicated at 13. Two units are shown in this figure, but since they operate individually, it can be understood that a greater number may be used if desired. The units are substantial duplicates, each including movable and stationary portions, and, as indicated in this figure, the stationary parts, especially the casing parts, are preferably connected together, so that the battery of units appear as a single mechanism.

Each unit utilizes a water cooling arrangement, this being illustrated as an annular water jacket 8 which is mounted on the unit pedestal, water jackets 9 and 11 being bolted thereto and having a water inlet 9a and a water outlet 11a. The water jackets 9 and 11 have their inner walls extending inwardly toward the axis, and form, with the inner wall of jacket 8, three sides of an annular chamber 12, the fourth side of which completes a substantially square cross-section to the chamber, the fourth wall being formed by a pair of discs 14 and 16, located side by side, the outer zones of which extend laterally outward to complete the fourth wall of the chamber. The discs also carry tubular extensions 22 and 23, respectively, in their axial zones, these extensions extending laterally outward beyond the water jackets 9 and 11, and are mounted for free rotative movement on and relative to shaft 13. Discs 14 and 16 carry the pistons which travel within the chamber 12, the disc 14 carrying a pair of oppositely-disposed pistons 17 and 18, while disc 16 carries a pair of oppositely disposed pistons 19 and 21. Each piston has the general dimensions of a cross-section of chamber 12 and is of suitable thickness, so that, in appearance, a piston projects beyond its disc into the zone of the other disc, thus producing the effect of four radial pistons within the chamber, the pistons, of course, being out of axial alinement.

These pistons are made operative in a cyclar development in such way as to provide the general characteristics of the Otto cycle, viz.: intake, compression, explosion or power and exhaust, doing this by the use of control mechanism which provides this succession.

In this development the pistons move relative to each other during a portion of the cycle, and with each other in other portions of the cycle, but in completing the cycle each piston has had the same movements. Since pistons 17 and 18 are carried by the same disc (14), they have their movements concurrently—as do pistons 19 and 21, carried by disc 16. For the purpose of indicating the general action in this respect, a series of diagrammatic views—Figs. X to XV—are presented, these being based on the showing of Fig. IV, with Figs. X and XV showing the same positions of pistons, to indicate the start of the cycle in Fig. X and the return of the pistons to the same positions in Fig. XV.

In these diagrammatic views, Fig. XI illustrates an intermediate position which forms one of the stations of the stage development of the operation. This view is shown but once, but it will be understood that in the operation, the parts will assume this same position, but with the pistons advanced, following the positions of Figs. XII, XIII, and XIV. In other words, during the advance of the pistons from the position of Fig. X to that of Fig. XII, the stage of Fig. XI is interposed; one set of pistons (17 and 18) have remained locked, while the other pair (19 and 21) have advanced until the position of Fig. XI is reached—the discs travelling relative to each other during this movement; the locked pair are then released, and all pistons advance from the positions of Fig. XI to that of Fig. XII, travelling concurrently, the cycle then causing the pair 19 and 21 to become locked. On the next advance the pair 17 and 18 advance to the positions occupied by the pair 19 and 21 in Fig. XI, to be followed by the concurrent advance into the positions of Fig. XIII. This action taking place as the pistons advance to the positions shown in Figs. XIV and XV.

In other words, using piston 17 to illustrate, this piston is locked in the position of Fig. X, and remains locked until the position of Fig. XI is reached, and then advances to the position of Fig. XII. It then advances to the position of piston 19 in Fig. XI, remaining unlocked until the succeeding advance to the position of Fig. XIII, where it remains locked (similar to piston 18 in Fig. XI) until released for the advance to the position of Fig. XIV. Advance from the latter position then takes place to the position occupied by piston 21 in Fig. XI, with the succeeding advance from the intermediate position carrying the piston to the position of Fig. XV.

During these various movements and the positions taken by the piston 17, it initially formed a stationary wall (Fig. X) defining one end of the inlet chamber between it and piston 19 during advance of the latter, this movement of piston 19 serving to draw in gas through the permanently open intake 49; at the same time it served as an abutment to prevent exhaust gases from passing to the intake chamber and to lead the exhaust gases advanced by piston 21 in the direction of the permanently open exhaust port 48. With the advance of piston 19 to the position of Fig. XI, and the succeeding advance of both pistons 19 and 17 to the position of Fig. XII, the charge has been segregated from the intake, and since piston 19 becomes locked in the position of Fig. XII, the succeeding advance of piston 17— then released—serves to compress the charge between these pistons within the space which, in Fig. XI, is indicated between pistons 18 and 19. The subsequent concurrent advance of the two pistons 17 and 19 to the positions indicated in Fig. XIII, places the compressed charge in proper position with respect to the spark plug 50, with piston 17 locked.

With the spark plug active the expansion of the charge forces advance of piston 19—piston 17 being locked and forming a stationary abutment—then passes to the position of piston 21 in Fig. XI, and then to the position shown in Fig. XIV, piston 17 passing to the position shown in this figure during the latter part of the advance of piston 19; since piston 17 is then released, with piston 19 locked, the advance of piston 17 serves to drive out the exhaust products of combustion, reaching the position of piston 21 in Fig. XI, succeeding concurrent advance of pistons advancing pistons 17 and 19 to the positions of Fig. XV and completing the cycle. Piston 17 has thus performed a service in each of the four activities of the cycle, serving as a stationary abutment in two of these and as an advancing piston in the other two.

As will be understood, the various advances referred to are provided by the effects of the ignition of the compressed charge, the latter taking place four times during the movement of the piston 17 from the position of Fig. X to that of Fig. XV, each of the pistons having a cycle similar to that described with respect to piston 17, so that, beginning with Fig. X, pistons 18, 19, 17 and 21 successively form the stationary abutment during ignition, while pistons 21, 18, 19 and 17 successively form the wall being advanced by the expansion of the gases due to such ignition.

As a result, the number of pistons is equal to the number of phases of the cycle, with a piston from each of the two discs 14 and 16 serving as opposing walls of an expansible chamber and with such expansible chamber advancing by stages of alternate expansion and contraction as the chamber moves through its circular path, the positions of the expanding phases being opposite, as are those of the contracting phases, and with these positions constant, with the result that the intake and exhaust ports 49 and 48 are constant in position, as is the position of the spark plug, although the chambers are themselves advancing. A single intake port, spark-plug and exhaust port will thus perform the services for all of the four impulses provided during the completion of the four-cycle or Otto cycle operation.

As will be understood the result is obtained by the controlled movements of the two discs 14 and 16 which while constant in their direction of movement have their movements timed so as to produce the piston movements referred to, a disc being held stationary during a portion of the cycle period and being movable in an advancing direction during the remaining portion, with the movements co-related with those of the other disc to cause activity of drive by one disc during the period when such other disk is stationary, excepting during the periods of advance from the position of Fig. XI to that of Fig. XII, etc., at which time both discs advance concurrently.

Consequently, if shaft 13 be operatively connected with the disks alternately, a complete revolution of either disc will occupy the period corresponding to two rotations of the crank shaft of an internal combustion engine of the four-cylinder type, with the disks alternately providing the impulses and each disk being active to provide an impulse twice during its revolution— first by one of its pistons and then by the other. The two discs thus perform the service of the four cylinder structures, with each of the disc pistons providing the cycle of the piston of each of the cylinders during the two revolutions of the crank shaft. It is made possible by the transfer of the power drive from one disc to the other in regular alternation.

To permit the proper drive action it is obvious that the discs must be capable of operative connection with shaft 13, and that such connection must be established at regular and timed intervals, so as to communicate the successive impulses to the shaft 13 to ensure continuous movement of said shaft. This is provided by suitable control mechanism, now to be described. And since the cycle of operation of each disc is similar to that of the other, either disc can be used as the basis of the detailed explanation.

Using disc 14 for the illustration, and referring to Fig. III, the lateral extension 22 carries a driving ring 26—the latter being keyed or splined to the shaft; this ring is shown in elevation in Fig. VI, ring 26 having its movements within a stationary ring 34 (also shown in elevation in Fig. VI), the two rings being disconnected while the disc is advancing, but being locked together during periods when the driving ring is to be held stationary. Similarly, the shaft 13 carries a cam ring 36, keyed or splined thereto; an elevation of this ring is seen in Fig. VII. If, then, the cam ring 36 be locked to the driving ring 26 while the latter is advancing, the advance of disc 14 will also advance the shaft 13 rotatively through the locked relation between rings 26 and 36; and if ring 36 is disengaged from ring 26 while the latter is being held stationary by ring 34, the shaft 13 will be free to continue its rotation. Since disc 16 carries a similar driving ring 26', and a stationary ring 34' adapted to be locked together, and shaft 13 also carries a second cam ring 36' adapted to be locked to ring 26', it will be understood that if mechanism is provided for controlling the locking activities in such manner that the locking engagement between rings 26 and 34 takes place concurrently with a locking engagement between rings 26' and 36', (the rings 26 and 36 being disconnected at such time, as are rings 26' and 34') the disc 16 will be active to provide the drive for shaft 13, with cam ring 36 moving with the shaft but disengaged from driving ring 26. When these conditions are reversed, the drive will be from disc 14 to shaft 13, with cam ring 36' moving with the shaft and disconnected from driving ring 26'. By providing such changed connections in regular and timed succession, the shaft 13 will be caused to rotate.

Referring first to the means for locking the driving ring 26 to the stationary ring 34, and referring first to Fig. VI, it will be seen that the driving ring is formed with four projecting lugs arranged in pairs, the lugs of a pair being indicated at 27 and 28 and being spaced apart, corresponding lugs being diametrically opposite.

The stationary ring 34 is provided with two recesses 60 and 61 opening on the inner periphery of the ring, these being spaced apart a distance equal to the angular length of a lug 27 or 28. These recesses are designed to receive holding dogs 42 and 43, respectively, the dogs being mounted for pivotal swinging movements between positions in which the dogs are housed within their recesses or have their free ends projecting outwardly of the recesses and into the path of movement of the lugs 27 and 28; a spring 47 for each dog urges the dog into the latter position. Dog 42 carries a lateral projection 41, while dog 43 has its inner face of a camming contour.

In Fig. VI the parts are shown in the positions they occupy in the position of Fig. XIII, with piston 17 locked and just as the drive has been shifted to disc 16. In this position both of the dogs 42 and 43 are projected with lug 28 positioned between the free ends of the dogs—and thus locked from movement in either direction— while lug 27 lies within the camming zone of dog 43. In this position driving ring 26 is locked against advance. If dog 42 is shifted into its housed position, ring 26 becomes free to advance in the direction of the arrow, such advance causing lug 27 to cam dog 43 into its housed position. If dog 42 returns to its projected position before lug 27 reaches the position of lug 28 in Fig. VI, dog 42 will prevent further advance of ring 26 until dog 42 is again retracted, whereupon lug 27 will be released and ring 26 can advance until the succeeding lug 28 reaches the position of the active lug 28 in said figure, the advancing lug 28 camming dog 43 to its retracted position during the advance.

The movement of the dog 42 to its retracted position is provided by two cam faces A and B carried by the cam ring 36, as indicated in Fig. VII. Since ring 36 is carried by and moves with the shaft 13, it will be understood that as the shaft rotates, cam A will first contact with projection 41 of dog 42 and retract the latter for an instant, and that this will be followed by a second retraction as cam B advances. With the parts in the positions of Fig. VI—the position of Fig. XIII—and while driving ring 26 is stationary, the advance of cam A makes it active with projection 41 to release lug 28; this takes place as piston 21 reaches the position of piston 19 in Fig. XI so that the release of lug 28, permits piston 21 to continue its advance carrying with it piston 17 (and driving ring 26) until lug 27 reaches dog 42, this taking place within the angular travel of ring 36 for a distance represented by the distance between cams A and B, and during which the pistons have presented the relation of Fig. XI. When, therefore, cam B becomes active with projection 41, lug 27 is also freed from restraint, and driving ring 26 is free to advance carrying with it the piston 17 (Fig. XIII) under the action of the ignited charge, leaving piston 21 (carried by disc 16) as the abutment. (Fig. XIV.)

With the release of lug 27 and the succeeding advance of ring 26, the inactive lug 28 (Fig. VI) will be brought to the position of the active lug, stopping the advance of the ring in the position of Fig. XV, to be followed by the cycle of operation of the cams A and B as described.

The connection between the driving ring 26 and the cam ring 36 is established by other means which will now be described: The driving ring 26 also is provided with two pairs of recesses opening on its inner periphery and serving a purpose similar to recesses 60 and 61—to receive dogs 29 and 31 mounted swingingly for movement between a position where they are housed within the recesses and a projected position, these dogs also being urged to projected position by springs 47a. Dog 29 differs from dog 31 by the addition of a tail 32 which projects outward into the space between rings 26 and 34, with the tail shaped to present the characteristics of a camming surface. A roll 33 is carried by the stationary ring 34 and also projects into this space between the rings 26 and 34. Hence, when ring 26 rotates, carrying these dogs with it, tail 32 reaches the roller 33, and by the camming action referred to, serves to shift dog 29 into retracted position; since each of the dogs 29 is tail-equipped in this manner, it can be understood that when either becomes active with roller 33, such dog will be retracted, the opposite dog 29 remaining projected.

The free ends of the projected dogs 29 and 31 are spaced apart a distance sufficient to receive between them a lug 37 carried on the periphery of cam ring 36; when in this position, the cam ring is locked to the driving ring through the presence of dog 29 in advance of lug 37, with dog 31 in rear of lug 37, thus preventing any relative movement between the rings. When, however, dog 29 is retracted by the roller 33, as described, the restraint provided by this dog is removed, so that the cam ring can advance independently of the driving ring, until the lug 37 reaches the opposite pair of dogs 29 and 31, whereupon dog 31 will be retracted as lug 37 rides beneath it, then dropping behind lug 37 after the latter has passed by. Dog 29, however, is not retracted in this position, thus setting up the locked relation between the rings and causing them to advance together until tail 32 encounters roller 33 and retracts dog 29. In other words, referring to Fig. VI, the locking engagement between rings 26 and 36 takes place when lug 37 is in position directly opposite that shown, the showing of the figure indicating the position where the locking engagement is released through the co-action of tail 32 with roller 33. Hence, during travel of lug 37 through the upper half of its path shown in Fig. VI, the two rings 26 and 36 will travel together, while during the lug travel through the lower half, the connection between these rings is broken.

As indicated in Fig. VII, lug 37 has not yet reached its locked position, although approaching it, at the time when cam A is active to release lug 28; this is the period during which disc 16 is the actual driver, and the period when the latter has advanced piston 19, for instance, to its position in rear of piston 18 (Fig. XI), so that as the active disc 16 continues to advance, it carries driving ring 26' forward and through the connections also advancing shaft 13, so that cam ring 36 continues to advance causing lug 37 to reach its locking position, with driving ring 26 released and advancing. As the locking position of lug 37 is reached and established, cam B retracts the dog 42, thus releasing ring 26 for its travel with and as the driver for cam ring 36.

The control mechanism for disc 16 is similar to that described with respect to disc 14, so that the connections between driving ring 26' and stationary ring 34', and that between ring 26' and cam ring 36' are established and broken in the same manner as that just described. The parts of the two control mechanisms are so arranged, that when lug 37 of one cam ring becomes locked, the lug 37 of the opposite cam ring is being released by the co-action of tail 32 and roller 33, so that each driving ring advances through a half revolution while the other is retained stationary in locked position, these conditions being reversed during the second half revolution. Since both cam rings are keyed to shaft 13 both will travel with the shaft, either as active driving connections or as inactive in the drive. In other words, there is a transfer of driving activity from disc to disc with each impulse set up by charge-ignition, the transfer being automatic and controlled, so that the movement of the shaft 13 is continuous during activity of the apparatus.

In Fig. III, which indicates the use of two units of this type, the cam ring 36' is of dual arrangement, with one side co-operating with the unit on the right and the other with the unit on the left, the ring being unitary rather than employing individual cam rings.

From the above explanation it will be understood that lug 27 does not serve as an actual restraining lug, since it is active with dog 42 only momentarily. It is provided, however, as a precautionary structure to prevent the driving ring from advancing from its stationary position more rapidly than the speed of its cam ring which becomes locked to the driving ring in this position, cam B being arranged so as to raise dog 42 at the instant when lug 37 is locked to the driving ring.

While the unit is shown and described for service along the lines of an internal combustion engine and having its movements provided by the successive impulses set up by individual ignition of compressed charges of an expansible medium, it is readily understood that the unit is operative for service in connection with other compressible and expansible mediums.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a casing adapted to provide walls of an annular channel, a freely rotatable power shaft having a pair of spaced cam rings secured thereto, a pair of discs freely rotatable on said power shaft, said discs providing walls to complete said annular channel, each of said discs carrying radially arranged pistons adapted to travel in said channel, a driving ring secured to each of said discs, a stationary ring surrounding each of said driving rings, holding dogs carried on said stationary rings and capable of engaging lugs formed on said driving rings, for locking the driving rings to said stationary rings at pre-determined intervals; and means carried by the cam rings and rendered active and inactive by cam-ring movements for releasing said dogs at pre-determined intervals.

2. In a device of the character described, a casing adapted to provide walls of an annular channel, a freely rotatable power shaft having a pair of spaced cam rings secured thereto, a pair of discs freely rotatable on said power shaft, said discs providing walls to complete said annular channel, each of said discs carrying radially arranged pistons adapted to travel in said channel, a driving ring secured to each of said discs, a stationary ring surrounding each of said driving rings, holding dogs carried on said stationary rings and capable of engaging lugs formed on said driving rings, for locking the driving rings to said stationary rings at pre-determined intervals, means for releasing said dogs at pre-determined intervals, said releasing means including a cam surface formed upon each of said cam rings and a projection formed on certain of said holding dogs, said cam surfaces and projections being rendered co-operative by the travel of the cam rings to control the time of activity of the releasing means.

3. In a device of the character described, a casing adapted to provide walls of an annular channel, a freely rotatable power shaft having a pair of spaced cam rings secured thereto, a pair of discs freely rotatable on said power shaft, said discs providing walls to complete said annular channel, each of said discs carrying radially arranged pistons adapted to travel in said channel, a driving ring secured to each of said discs, a stationary ring surrounding each of said driving rings, holding dogs carried on said stationary rings and lugs formed on said driving rings, whereby said driving rings may be locked to said stationary rings at pre-determined intervals, means for releasing said dogs at pre-determined intervals, said releasing means including a cam surface formed upon each of said cam rings, a projection formed on certain of said holding dogs and adapted to be engaged by cam surfaces on the cam rings, and means for alternately locking and unlocking each of said driving rings to its adjacent cam ring at each half revolution of said power shaft.

4. In a device of the character described, a casing adapted to provide walls of an annular channel, a freely rotatable power shaft having a pair of spaced cam rings secured thereto, a pair of discs freely rotatable on said power shaft, said discs providing walls to complete said annular channel, each of said discs carrying radially arranged pistons adapted to travel in said channel, a driving ring secured to each of said discs, a stationary ring surrounding each of said driving rings, holding dogs carried on said stationary rings and lugs formed on said driving rings, whereby said driving rings may be locked to said stationary rings at pre-determined intervals, means for releasing said dogs at pre-determined intervals, said releasing means including a cam surface formed upon each of said cam rings and a projection formed on certain of said holding dogs, and means for alternately locking and unlocking each of said driving rings to its adjacent cam ring at each half revolution of said power shaft, said means including driving dogs carried by each of said driving rings and engaging a lug formed on said cam ring.

5. In a device of the character described, a casing adapted to provide walls of an annular channel, a freely rotatable power shaft having a pair of spaced cam rings secured thereto, a pair of discs freely rotatable on said power shaft, said discs providing walls to complete said annular channel, each of said discs carrying radially arranged pistons adapted to travel in said channel, a driving ring secured to each of said discs, a stationary ring surrounding each of said driving rings, holding dogs carried on said stationary rings, lugs formed on said driving rings and adapted to be co-operatively engaged by the dogs on the stationary ring, whereby said driving rings may be locked to said stationary rings at pre-determined intervals, means for releasing said dogs at pre-determined intervals, said releasing means including a cam surface formed upon each of said cam rings, a projection formed on certain of said holding dogs adapted to be engaged by a cam surface formed on the cam rings, means for alternately locking each of said driving rings to its adjacent cam ring at each half revolution of said power shaft, said means including driving dogs carried by each of said driving rings and engaging a lug formed on said cam ring, means for releasing said last mentioned means and embodying a roller mounted on each of said stationary rings, and an elbow lever secured to one of said holding dogs of each of said driving rings and being capable of engaging its roller at a predetermined time.

CLARENCE C. ENGLISH.